US010496980B2

(12) United States Patent
Mathew et al.

(10) Patent No.: US 10,496,980 B2
(45) Date of Patent: *Dec. 3, 2019

(54) CONTEXT-BASED AUTOMATED TRANSACTION PROCESSING CONTROL

(71) Applicant: Microsoft Technology Licensing, LLC, Redmond, WA (US)

(72) Inventors: Ashvin Mathew, Kirkland, WA (US); Derrick Steven Bazlen, Woodinville, WA (US); Jeffrey Blucher, Redmond, WA (US); Sylvester M. La Blanc, Issaquah, WA (US); Andreas Hofmann, North Bend, WA (US); Gregg Robert Dingle, Mill Creek, WA (US); Brendan O'Meara, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 508 days.

This patent is subject to a terminal disclaimer.

(21) Appl. No.: 14/838,993

(22) Filed: Aug. 28, 2015

(65) Prior Publication Data

US 2015/0379500 A1 Dec. 31, 2015

Related U.S. Application Data

(63) Continuation of application No. 14/104,369, filed on Dec. 12, 2013, now Pat. No. 9,152,955, which is a
(Continued)

(51) Int. Cl.
*G06Q 20/32* (2012.01)
*G06F 9/455* (2018.01)
(Continued)

(52) U.S. Cl.
CPC ..... *G06Q 20/3224* (2013.01); *G06F 9/45512* (2013.01); *G06Q 10/10* (2013.01);
(Continued)

(58) Field of Classification Search
None
See application file for complete search history.

(56) References Cited

U.S. PATENT DOCUMENTS 5,602,377 A 2/1997 Beller
6,179,206 B1 1/2001 Matsumori
(Continued)

OTHER PUBLICATIONS

Prosecution History for U.S. Appl. No. 14/104,369 including: Response to Notice Requiring Inventor's Oath or Declaration dated Jun. 24, 2015, Notice of Allowance dated Jun. 5, 2015, Amendment After Final dated May 20, 2015, Final Office Action dated May 4, 2015, Amendment dated Feb. 27, 2015, and Non-Final Office Action dated Nov. 17, 2014, 63 pages.
(Continued)

*Primary Examiner* — Scott A Zare
(74) *Attorney, Agent, or Firm* — Christopher J. Volkmann; Kelly, Holt & Christenson, PLLC

(57) ABSTRACT

A computer implemented method for reducing input performed in a commerce based application is provided. The method includes receiving a sequence of input values from an input device and associating the sequence of input values with an object in the application based on the sequence. A context of the application is determined. One or more tasks in the application are automatically performed based on the object, the context and the sequence of input values.

16 Claims, 9 Drawing Sheets

Related U.S. Application Data continuation of application No. 13/093,506, filed on Apr. 25, 2011, now Pat. No. 8,635,111, which is a continuation of application No. 11/097,353, filed on Apr. 1, 2005, now Pat. No. 7,953,633.

(51) Int. Cl.
| | | |
|---|---|---|
| *G06Q 10/10* | (2012.01) | |
| *G06Q 20/20* | (2012.01) | |
| *H04W 4/80* | (2018.01) | |
| *G06Q 10/08* | (2012.01) | |

(52) U.S. Cl.
CPC ........... *G06Q 20/20* (2013.01); *G06Q 20/202* (2013.01); *G06Q 20/3278* (2013.01); *H04W 4/80* (2018.02); *G06Q 10/087* (2013.01)

(56) References Cited

U.S. PATENT DOCUMENTS

| | | | |
|---|---|---|---|
| 6,263,383 | B1 | 7/2001 | Lee |
| 6,343,276 | B1 | 1/2002 | Barnett |
| 6,351,647 | B1 | 2/2002 | Gustafsson |
| 6,431,444 | B1 | 8/2002 | Gatto |
| 6,795,809 | B2 | 9/2004 | O'Brien et al. |
| 7,096,030 | B2 | 8/2006 | Huomo |
| 7,171,400 | B2 | 1/2007 | Koubenski |
| 7,953,633 | B2 | 5/2011 | Mathew et al. |
| 8,494,908 | B2 * | 7/2013 | Herwig ............... G06Q 20/201 705/16 |
| 8,635,111 | B2 | 1/2014 | Mathew et al. |
| 2001/0037207 | A1 | 11/2001 | Dejaeger |
| 2001/0051876 | A1 | 12/2001 | Seigel |
| 2003/0083965 | A1 | 5/2003 | Taylor |
| 2007/0027732 | A1 | 1/2007 | Hudgens |
| 2011/0202412 | A1 * | 8/2011 | Mathew ............. G06F 9/45512 705/16 |
| 2014/0100979 | A1 | 4/2014 | Mathew et al. |

OTHER PUBLICATIONS

Prosecution History for U.S. Appl. No. 13/093,506 including: Issue Notification dated Dec. 13, 2013, Notice of Allowance dated Sep. 17, 2013, Amendment dated Aug. 6, 2013, Office Action dated Apr. 26, 2013, Amendment with RCE dated Jan. 24, 2013, Final Office Action dated Nov. 26, 2012, Response to Restriction Requirement dated Oct. 26, 2012, Requirement for Restriction/Election dated Oct. 17, 2012, Amendment dated Jul. 16, 2012, Office Action dated May 2, 2012, Application and Drawings filed Apr. 25, 2011, 104 pages.

Busting Lines, Building Relationships: New Fijitsu Handheld and TouchPointMobile Transforms Wireless Retailing—ISS Inc Solution Delivers Mobile POS, Multi-Channel Management. Business Wire. Jun. 26, 2001.

Skydel, Seth, Short range—long value; RFID: Radio Frequency Identification—technology applications offer benefits to transportation and mobile workface operation. Transport Technology Today. Apr. 2002, p. 10 (8).

Prosecution History for U.S. Appl. No. 11/097,353 inducting: Issue Notification dated May 11, 2011, Notice of Allowance dated Jan. 28, 2011, Amendment dated Nov. 18, 2010, Non-Final Office Action dated Aug. 18, 2010, Amendment with RCE dated Jul. 1, 2010, Examiner Interview Summary dated Jun. 30, 2010, Final Office Action dated Apr. 1, 2010, Amendment dated Jan. 5, 2010, Non-Final Office Action dated Aug. 28, 2009, Amendment with RCE dated Jun. 19, 2009, Advisory Action dated Apr. 27, 2009, Part 1 of 2.

Prosecution History U.S. Appl. No. 11/097,353 including: Amendment dated Apr. 10, 2009, Examiner Interview Summary dated Mar. 27, 2009, Final Office Action dated Feb. 3, 2009, Amendment dated Nov. 11, 2008, Non-Final Office Action dated May 30, 2008 and Application and Drawings filed Apr. 1, 2005, 207 pages.

* cited by examiner

| MICROSOFT RETAIL MANAGEMENT SYSTEM - POINT OF SALE | ☒ |
|---|---|

| SALES | COMMON TASKS |
|---|---|

WED, NOV. 24, 2004

| ITEM NO. | DESCRIPTION | QTY. | PRICE | TAX | EXTENDED PRICE |
|---|---|---|---|---|---|
| 25000-10202 | PAJAMAS SMALL... | 1 | $12.99 | - | $12.99 |

REMOVE | VIEW/EDIT | EDIT QTY. | DISCOUNT

| TENDERED | $0.00 |
|---|---|
| | |
| TOTAL DUE | $14.08 |

| SUBTOTAL | $12.99 |
|---|---|
| TAX | $1.09 |
| TOTAL | $14.08 |

Common Tasks:
- CUSTOMERS BY LAST NAME
- ITEMS BY DESCRIPTION
- DISCOUNT TRANSACTION
- HOLD RECALL
- DROP/PAYOUT
- NEW CUSTOMER
- TIME CLOCK
- CANCEL TRANSACTION

SELECT A CUSTOMER    SHIPPING ADDRESS

ADD CUSTOMER

| HELP F1 | ITEMS F2 | CUSTOMER F3 | TRANSACTION F5 | TASKS F6 | TOOLS F7 | RETURN F8 | TENDER F12 |

FIG. 5

| MICROSOFT RETAIL MANAGEMENT SYSTEM - POINT OF SALE | ☒ |
|---|---|

| SALES | COMMON TASKS |
|---|---|

WED, NOV. 24, 2004

| ITEM NO. | DESCRIPTION | QTY. | PRICE | TAX | EXTENDED PRICE |
|---|---|---|---|---|---|
| 25000-10202 | PAJAMAS SMALL... | 1 | $12.99 | - | $12.99 |

REMOVE | VIEW/EDIT | EDIT QTY. | DISCOUNT

| TENDERED | $0.00 | | SUBTOTAL | $12.99 |
|---|---|---|---|---|
| | | | TAX | $1.09 |
| TOTAL DUE | $14.08 | | TOTAL | $14.08 |

COMMON TASKS:
- CUSTOMERS BY LAST NAME
- ITEMS BY DESCRIPTION
- DISCOUNT TRANSACTION
- HOLD RECALL
- DROP/PAYOUT
- NEW CUSTOMER
- TIME CLOCK
- CANCEL TRANSACTION

PURCHASE HISTORY

GREGORY WEBER
9392 NINTH AVE.
REDMOND, WA 93893
(425) 555-0129

SHIPPING ADDRESS
GREGORY WEBER
9392 NINTH AVE.
REDMOND, WA 93893

| HELP F1 | ITEMS F2 | CUSTOMER F3 | TRANSACTION F5 | TASKS F6 | TOOLS F7 | RETURN F8 | TENDER F12 |

FIG. 6

| MICROSOFT RETAIL MANAGEMENT SYSTEM - POINT OF SALE | ☒ |
|---|---|

| SALES | | | | | | MULTIPLE MATCHES |
|---|---|---|---|---|---|---|
| WED, NOV. 24, 2004 | | | | | | |
| ITEM NO. | DESCRIPTION | QTY. | PRICE | TAX | EXTENDED PRICE | SOFTBALL BOOK |
| | | | | | | CTRL 1 |
| | | | | | | JOHN, SMITH |
| | | | | | | CTRL 2 |

| TENDERED | $0.00 | SUBTOTAL | $0.00 |
|---|---|---|---|
| | | TAX | $0.00 |
| TOTAL DUE | $0.00 | TOTAL | $0.00 |

ADD CUSTOMER

| HELP F1 | ITEMS F2 | CUSTOMER F3 | TRANSACTION F5 | TASKS F6 | TOOLS F7 | RETURN F8 | TENDER F12 |

FIG. 8

CONTEXT-BASED AUTOMATED TRANSACTION PROCESSING CONTROL

CROSS-REFERENCE TO RELATED APPLICATION(S)

The present application is a continuation of and claims priority of U.S. patent application Ser. No. 14/104,369, filed Dec. 12, 2013, which is a continuation of and claims priority of U.S. patent application Ser. No. 13/093,506, filed Apr. 25, 2011, which is a continuation of and claims priority of U.S. patent application Ser. No. 11/097,353, filed Apr. 1, 2005, the contents of which are hereby incorporated by reference in their entirety.

BACKGROUND

The present invention relates to processing data from an input device. In particular, the present invention relates to performing tasks in a commerce application based on input data.

There are a number of different input devices that communicate with a computer. For example, retail input devices can include a keyboard for manual input, a barcode scanner for scanning barcodes and a magnetic stripe reader for reading a magnetic stripe on a credit card. Additionally, pointer devices, touch screens and other devices can be used. A commerce based application such as a retail software application running on the computer uses input data from these devices for a number of different tasks, for example to process a transaction.

Typically, software applications require a prompt or other indication of a particular input that the software application can expect. This prompting requires additional tasks to be performed by a user. Typically, the prompting is provided by a form of "touch" input device, where a user has to physically touch the device, such as a mouse, keyboard or touch screen. These additional input operations lead to increased time in processing a transaction, mistakes and training costs. For example, in a simple one-item transaction, a user will need to prompt the application to expect input related to one or more items for purchase, expect input related to customer information and expect input related to a tender used for the transaction. Thus, there is a need to provide an efficient manner for performing tasks based on input from an input device.

The discussion above is merely provided for general background information and is not intended to be used as an aid in determining the scope of the claimed subject matter.

SUMMARY

A computer implemented method for reducing input performed in a commerce based application is provided. The method includes receiving a sequence of input values from an input device and associating the sequence of input values with an object in the application based on the sequence. A context of the application is determined. One or more tasks in the application are automatically performed based on the object, the context and the sequence of input values.

Another aspect of the present invention relates to a commerce based system having a computer with memory and at least one input port. A plurality of input devices are operably coupled to the at least one input port to send a sequence of input values to the input port. A commerce based application program is stored on the memory and operably coupled to the at least one input port to receive a particular sequence of input values from one of the plurality of input devices. The application program includes an application context module defining a context of the application program and a transaction processing module operably coupled to the application context module. The transaction processing module is adapted to receive the particular sequence, associate the particular sequence with an object based on the sequence and perform one or more tasks based on the object, the particular sequence and the context of the application program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5-9 are screen shots of a retail application that illustrates tasks performed based on input from an input device.

DETAILED DESCRIPTION

Figure 1:
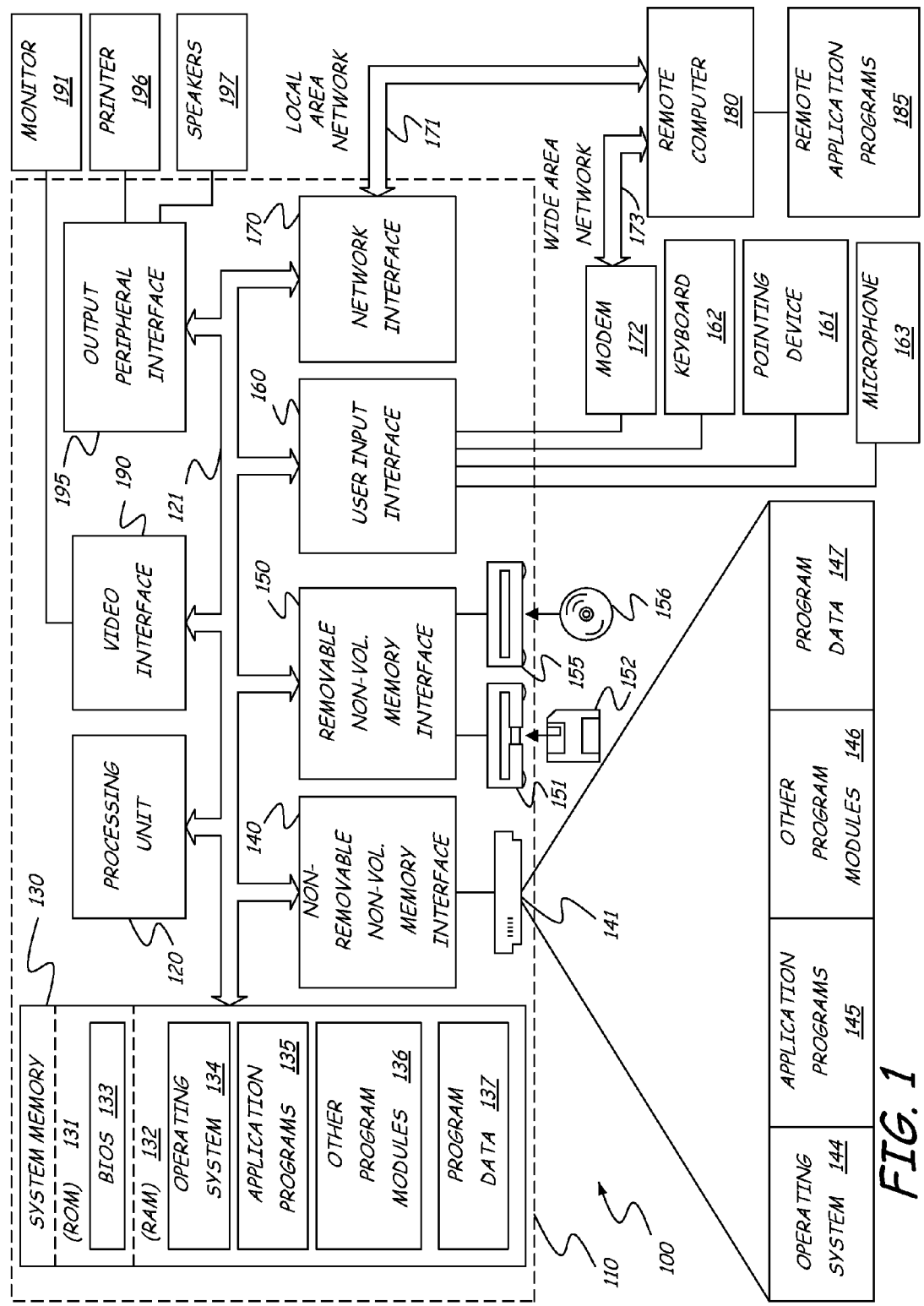
FIG. 1 is a block diagram of a general computing environment in which the present invention can be useful.

Prior to discussing the present invention in greater detail, one embodiment of an illustrative environment which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
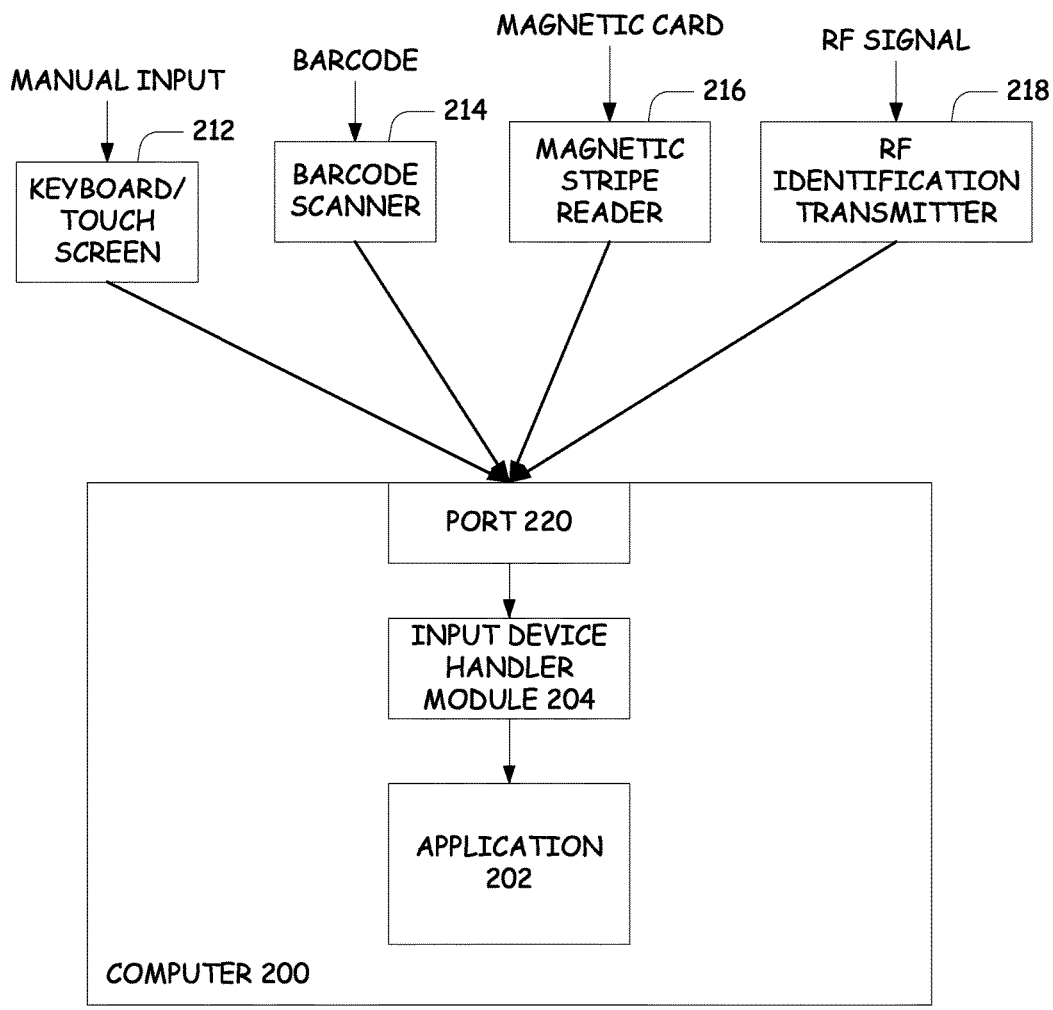
FIG. 2 is a block diagram of a plurality of input devices providing input to a computer.

FIG. 2 illustrates an environment wherein a plurality of input devices communicate with a computer 200, an example of which is described above with respect to FIG. 1. Computer 200 includes at least one application 202 and an input device handler 204. A plurality of input devices including a keyboard and/or a touch screen 212, a barcode scanner 214, a magnetic stripe reader 216 and a RF identification receiver 218 communicate through at least one port 220 to computer 200. As appreciated by those skilled in the art, other input devices, such as a magnetic ink character recognition (MICR) reader, may also be used in accordance with the present invention and multiple input devices can share a common form factor and/or input conduit.

Keyboard/touch screen 212 receives manual input from a user, barcode scanner 214 scans a barcode, magnetic stripe reader 216 reads a magnetic stripe of a magnetic card and RF identification receiver 218 receives radio frequency signals that are sent to port 220. In accordance with the present invention, multiple ports similar to port 220 that are operably coupled to separate input devices can also be used. Each of the multiple ports can provide information received from a respective input device to input device handler module 204.

Input device handler 204 receives input from the plurality of devices through at least one port 220 and sends the input to application 202. In an exemplary embodiment, the input includes a sequence of input values that relate to various information, such as a customer name, a product identification number and a credit card account number. Application 202 detects the input and automatically performs tasks based on the input. The tasks are also based on a particular context for the application. In accordance with an embodiment of the present invention, using application 200, the need for use of keyboard/touch screen 212 can be reduced and in some cases eliminated during processing of a transaction. For example, a cashier need only use a scan, scan and swipe to completely process a transaction. Thus, operation of other input devices that use touching is minimized.

Figure 3:
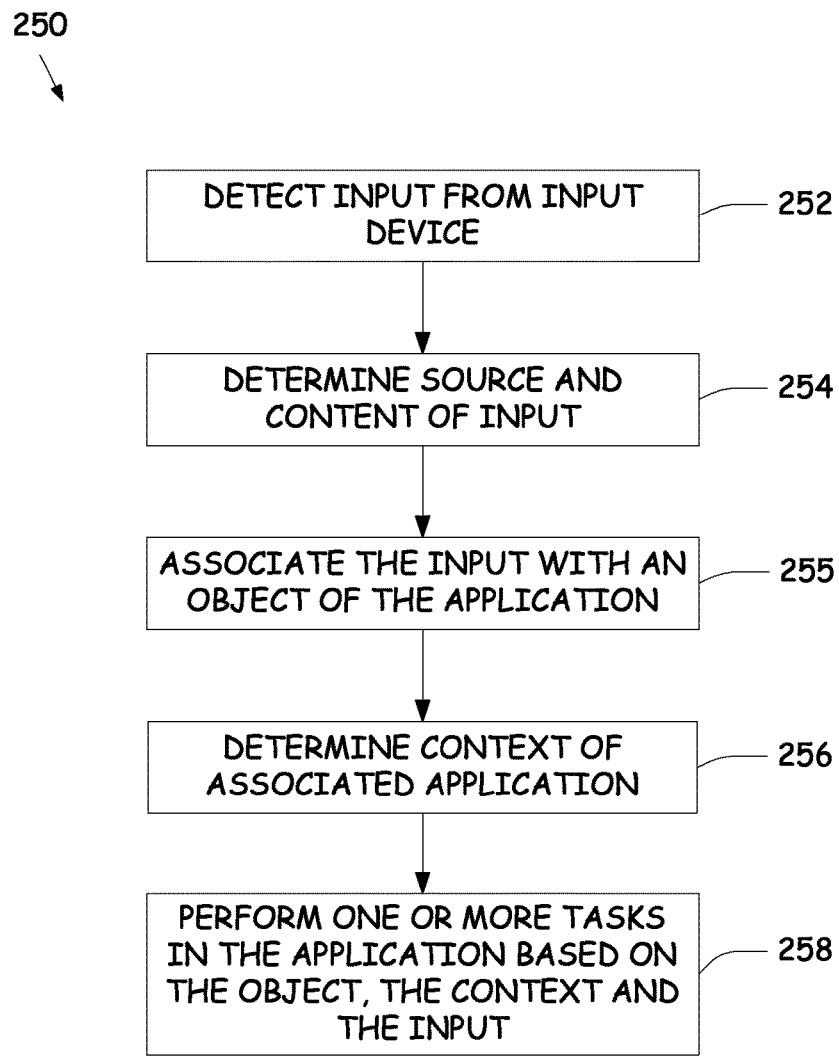
FIG. 3 is a flow diagram of a method for processing input from an input device.

FIG. 3 is an exemplary method for processing input from an input device in a commerce application. As discussed below, the input is processed based on program heuristics to predict a logical flow for the input. At step 252, input from the input device is detected. For example, input device handler 204 can detect input from any of the input devices described above. At step 254 a source and content of the input is determined. In one embodiment, the source and content of the input can be determined in a manner described in U.S. application Ser. No. 10/740,936, filed Dec. 19, 2003, entitled AUTOMATED INPUT DETERMINATION, the contents of which are hereby incorporated by reference in its entirety. For example, if a sequence of sixteen input values is received, the sequence can indicate that a magnetic stripe reader provided the input. Other methods of determining the source and content can be used. The sequence is associated with an object in the application based on the content and/or the source of the sequence at step 255. Exemplary objects for a commerce application include a retail item, a customer, a tender, an order a shipping notice, etc. The context of an associated application is determined at step 256. The context can be related to one or more aspects of the application, for example a particular mode for the application, a location, a user, etc.

At step 258, one or more tasks (or actions) are automatically performed based on the object, the context and the input. For example, these tasks can include a comparison of the input with an inventory list, a customer list and/or a receipt list. Further tasks can additionally be performed, such as calculation of sales tax, requesting approval for a credit card transaction and/or presenting multiple options to a user. In some instances, the context of the application is switched based on the input. For example, the context can be switched from an initial made to a sales transaction made or a return void mode. The tasks that are performed are determined from heuristics based on a logical flow for the application based on the input.

Figure 4:
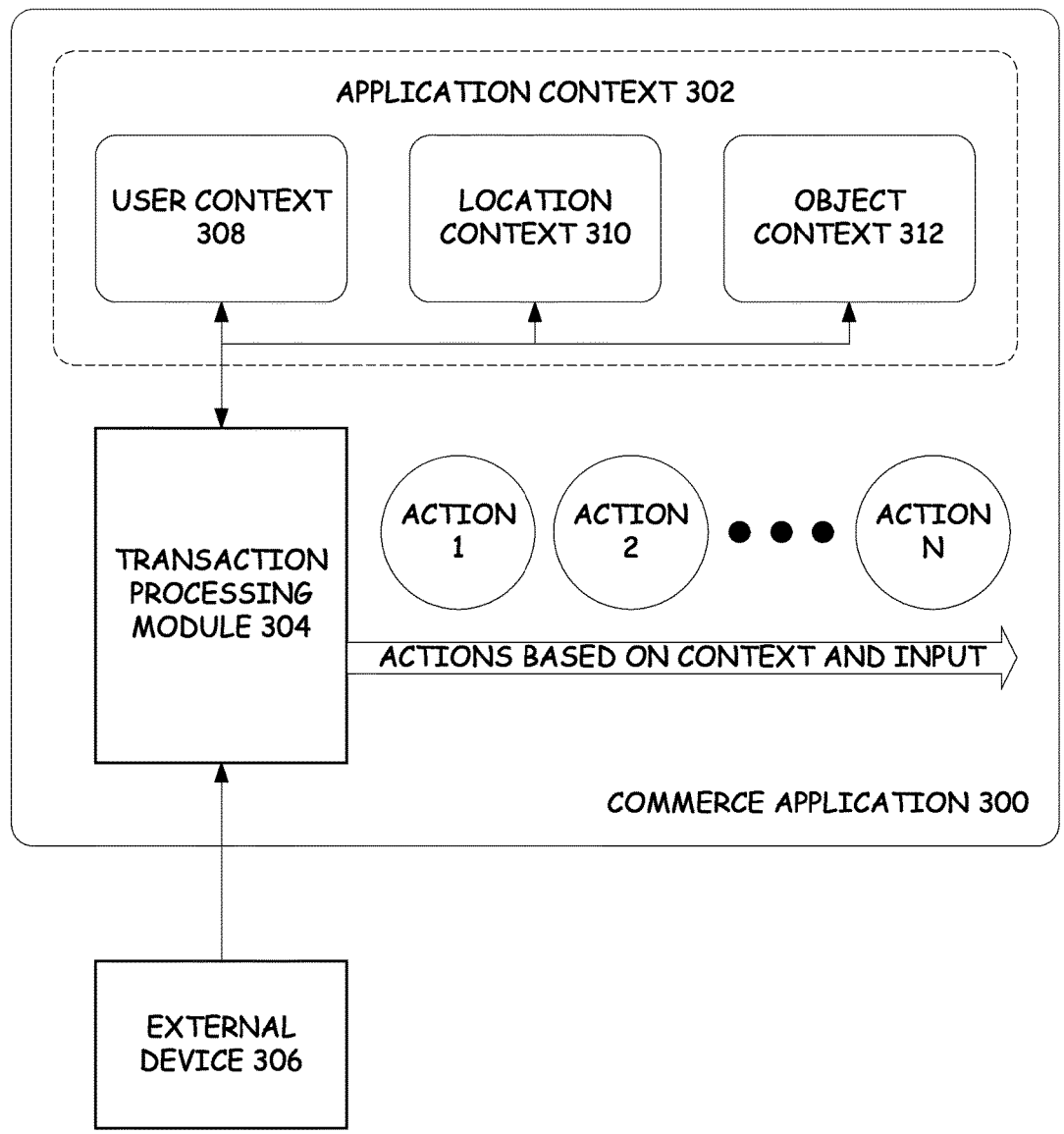
FIG. 4 is a block diagram of a retail application that receives input from an external device.

FIG. 4 is a block diagram of an exemplary commerce application 300 for use with the present invention. Commerce application 300 includes an application context 302 and a transaction processing module 304. An external device 306, which can be any of the input devices discussed above, provides input to application 300, which is then sent to transaction processing module 304.

Transaction module 304 is based on program heuristics designed to reduce, and in some cases eliminate, input from a user of devices such as a mouse and/or a keyboard. Based on the input of external device 306, transaction processing module 304 associates the input with an object and utilizes a plurality of actions, herein shown as actions 1-N, depending on application context 302. The object can be an object as discussed above. Application context 302 includes a user context 308, location context 310 and object context 312. Other context associated with application context 302 can also be used.

User context 308 includes default behavior actions based on a particular user for application 300. For example, the user may be an owner, a manager, a cashier, etc. Each of these user contexts can have varying attributes, roles and permissions. For example, retail application 300 can be designed such that only a manager or owner can void a transaction. Location context 310 is based on the location of retail application 300. For example, the location could be at a point of sale, a back office setting, a warehouse, etc. Location context 310 thus includes default behavior actions based on the location. In a point of sale context, scanning an item can populate a retail transaction with the item's details. Object context 312 identifies various objects, such as items, customers, tenders, transactions, receipts, etc. Transaction module 304 associates the input with one or more of these objects. Object context 312 includes default behavior actions based on user context 308, location context 310 and the one or more objects.

Given the application context 302, which includes user context 308, location context 310 and object context 312, transaction processing module 304 selects one or more actions based on the context and the input from external device 306. For example, one action can be related to adding a customer to a transaction based on a customer scan of a customer ID card. Another action can be related to adding an item to a transaction based on a bar code scan of an item's bar code. Yet another action can be based on tendering an amount to a credit card based on a card swipe from a magnetic stripe reader.

Thus, in a store or other environment having bar coded inventory with customer cards and electronic credit or debit processing, a sales cashier can complete a sales transaction without accessing input devices such as keyboards, pointer devices and/or touch panels. Instead, a transaction is completed with only a scan of an item, a scan of a customer card and a swipe of the credit card. The transaction processing module 204, based on heuristics, compares the first scan to an inventory list and adds an item to the transaction, the second scan adds a customer to the transaction and the credit card swipe tenders the credit card to the transaction and prints out a receipt.

FIGS. 5-9 are exemplary screen shots that illustrate tasks performed by a retail application based on input from an input device and a context of the retail application. The retail application is at a point of sale location. Heuristics can help to predict a logical flow for the retail application based on the input. For example, if a credit card is swiped after items are entered in a transaction, the credit card is most likely the tender for the transaction. It will be appreciated that the present invention can be implemented in other environments and/or locations, for example in back office settings and shipping warehouses.

Figure 7:
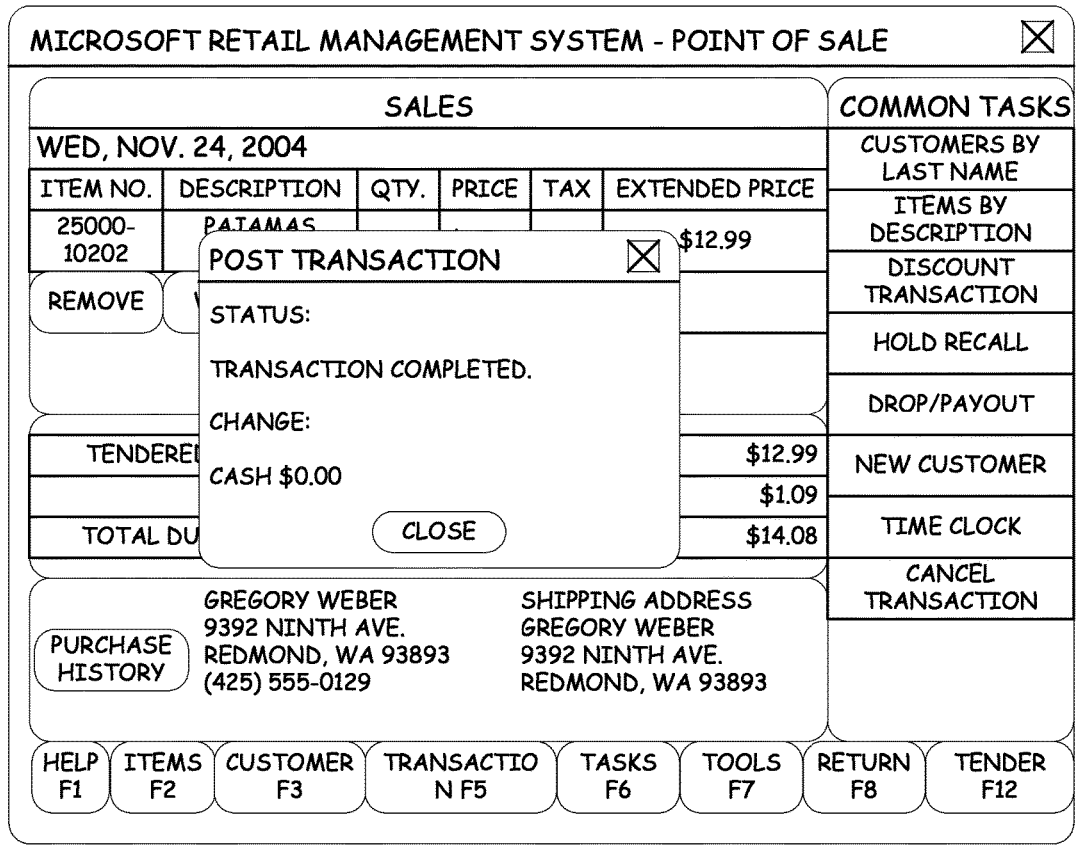

FIGS. 5-7 are screen shots for a single sales transaction. In FIG. 5, a user has scanned a bar code for an item. Input can also be provided from an RF identification receiver. The retail application determines the source and the content of the input as discussed above. Based on the source and content of the input, the input is associated with one or more objects. The input here is associated with an inventory item. A context of the retail application is also determined. In this case, the context is an initial mode. Based on the one or more objects, the context and the input, tasks are performed in the retail application. For the bar code scan, a comparison of the input is made with inventory data, a customer list and/or a receipt list. As shown in FIG. 5, the retail application has located and matched the input with item number 25000-010202. This item, along with any other information, is automatically added to a sales transaction and a subtotal and tax for the transaction are calculated. Furthermore the context of the retail application is updated to a sales transaction mode. In the sales transaction mode, further items that are scanned are automatically added to the transaction.

FIG. 6 is a screen shot wherein a customer barcode has been scanned. The input is detected and associated with one or more objects. The context of the application, herein the sales transaction mode, is also determined. In this case, the input is compared to a database and matches a customer's information. This customer information is automatically added to the transaction. In FIG. 7, a user has swiped a credit card using a magnetic stripe reader. The credit card information is associated with a tender for the application. Since the retail application is still in the sales transaction mode, the tasks to be performed include posting the transaction, tendering a sale amount to the credit card, printing a sales receipt and opening a cash drawer. As a result, a full transaction can be processed in the application using only the bar code scanner and the magnetic stripe reader. A user has only needed to scan an item, scan a customer card and swipe a credit card. Thus, no manual input, for example, using a keyboard, pointer device and/or a touch panel is necessary from the user.

FIG. 8 is a screen shot for processing input in a retail application. In this case, a user has scanned an item and the input has been detected as well as the context been determined. The input has matched multiple items from a data source associated with the retail application. The input has matched an item (Softball Book) and a customer (John, Smith). Both of these options are presented to the user in order for the user to quickly select either option and continue with the transaction. For example, if the user scanned the item (Softball Book), the user can easily select the softball book to be put into the transaction.

Figure 9:
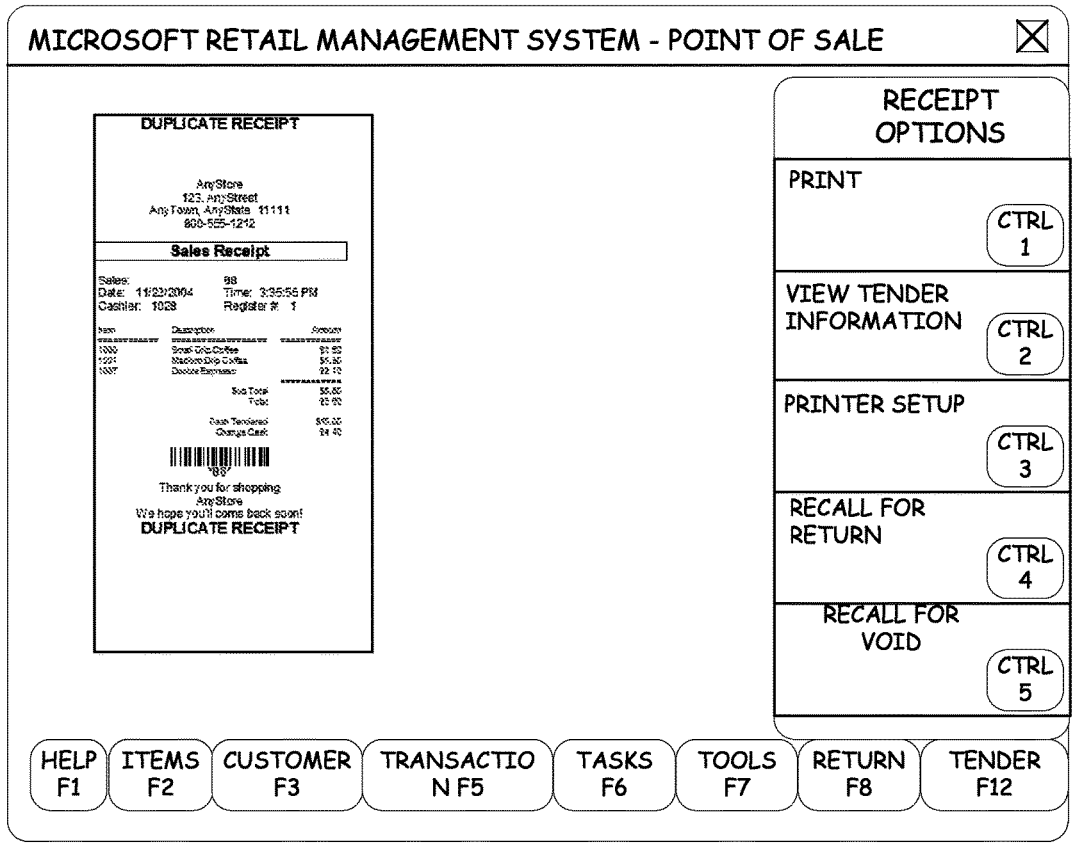

FIG. 9 is a screen shot wherein a user has scanned in a sales receipt, for example by using a bar code scanner. Automatically, the sales receipt appears in a window of the retail application and various options are presented to the user. The retail application is also updated to a return void mode. Accordingly, if sale items are scanned and matched to an item in the sales receipt, a return void transaction will begin.

Using the present invention discussed above, input from an input device can be automatically processed in order to reduce input required by a user. The tasks that are automatically performed by an application can be based on heuristics that predict an intended action of the user. For example, given a retail point of sale context, scanning an item will automatically populate a retail transaction with the item's detail, such as a description, an item number and an amount. Further input can produce additional processing tasks for the retail application. As discussed above, the present invention can also be extended to other inputs, input devices and/or contexts. For example, in a warehouse setting, a scanned item provided from an RF device can automatically enter an application into a shipping mode and print and send a shipping notice.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system composing:
   an optical device configured to generate a sensor signal indicative of an object optically sensed by the optical device; and
   an application component configured to:
      receive the sensor signal from the optical device;
      identify a location context indicative of a location associated with the application component;
      identify a data object associated with the application component based on the sensor signal; and
      automatically perform a transaction task, associated with a transaction, based on:
         the identified data object, and
         the identified location context.

2. The computing system of claim 1, wherein the application component is configured to automatically select the transaction task, from plurality of transaction tasks, based on the location context.

3. The computing system of claim 1, wherein the object comprises a machine-readable code.

4. The computing system of claim 3, wherein the sensor signal represents the machine-readable code.

5. The computing system of claim 4, wherein
   the machine-readable code comprises a bar code,
   the optical device comprises a bar code scanner, and
   the application component is configured to identify an item for the transaction based on the bar code.

6. The computing system of claim 4, wherein the application component is configured to:
   identify the data object based on the machine-readable code, the data object comprising a customer object; and
   perform a transaction task using the customer object.

7. The computing system of claim 6, wherein the customer object comprises customer information, and the application component is configured to:
- populate a transaction form with the customer information.

8. The computing system of claim 1, wherein the object is associated with an item for the transaction.

9. The computing system of claim 8, wherein
the transaction task comprises a first task,
the data object represents the item, and
the application component is configured to:
- determine whether the location is a point of sale location or a non-point of sale location;
- in response to a determination that the location is a point of sale location, perform the first task by automatically populating the transaction with the item and calculating an amount for the transaction; and
- in response to a determination that the location is a non-point of sale location, perform a second task that is different than the first task.

10. The computing system of claim 1, wherein the application component is configured to:
- based on the sensor signal, define an application context; and
- based on the application context, select an operation mode for the application component.

11. The computing system of claim 10, wherein the application context comprises an object context.

12. The computing system of claim 10, wherein the application context comprises a user context.

13. The computing system of claim 1, wherein the location context is indicative of a location of the object.

14. A computing system comprising:
- a sensor device comprising at least one of:
  - an optical device, or
  - a radio-frequency (RF) identification receiver,
  - wherein the sensor device is configured to generate a sensor signal indicative of a physical object sensed by the sensor device; and
- an application component configured to:
  - receive the sensor signal;
  - determine whether a location context associated with the application component is indicative of a point of sale location; and
  - in response to a determination that the location context is indicative of a point of sale location, perform a first task, using a sequence of input values that represents a data object, by automatically populating a transaction with the data object and calculating an amount for the transaction; and
  - in response to a determination that the location context is not indicative of a point of sale location, perform a second task that is different than the first task.

15. The computing system of claim 14, wherein the sensor device comprises an optical device.

16. The computing system of claim 15, wherein
the physical object is associated with a user; and
the data object comprises a data record that stores user information associated with the user.

* * * * *